United States Patent
Kanetake et al.

(10) Patent No.: US 6,493,214 B1
(45) Date of Patent: Dec. 10, 2002

(54) SOLID ELECTROLYTIC CAPACITOR

(75) Inventors: Yasuo Kanetake, Kyoto (JP); Makoto Aoyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/616,064

(22) Filed: Jul. 13, 2000

(30) Foreign Application Priority Data

Jul. 14, 1999 (JP) .......................................... 11-199932

(51) Int. Cl.$^7$ .............................. H01G 9/04; H01G 9/10
(52) U.S. Cl. ......................... 361/531; 361/532; 361/538
(58) Field of Search ................................. 361/523–541

(56) References Cited

U.S. PATENT DOCUMENTS

| | | | | |
|---|---|---|---|---|
| 4,907,131 A | * | 3/1990 | Neal | 361/534 |
| 4,935,848 A | * | 6/1990 | Yamane et al. | 361/534 |
| 5,007,149 A | * | 4/1991 | Schnabel | 29/25.03 |
| 5,057,973 A | * | 10/1991 | Gouvernelle et al. | 361/534 |
| 5,198,967 A | * | 3/1993 | Kuranuki et al. | 361/523 |
| 5,424,909 A | * | 6/1995 | Kuriyama | 361/534 |
| 5,478,965 A | * | 12/1995 | Hashiba | 29/25.03 |
| 5,644,281 A | * | 7/1997 | Kuriyama | 337/295 |
| 5,661,628 A | * | 8/1997 | Yamagami | 361/275.4 |
| 5,781,401 A | * | 7/1998 | Tomiyasu et al. | 361/303 |
| 5,784,248 A | * | 7/1998 | Tomiyasu et al. | 361/523 |
| 5,805,413 A | * | 9/1998 | Kurita | 361/534 |
| 5,850,332 A | * | 12/1998 | Kunieda et al. | 361/523 |

FOREIGN PATENT DOCUMENTS

JP 2-256223 * 10/1990 ............ H01G/9/12

* cited by examiner

Primary Examiner—Anthony Dinkins
Assistant Examiner—Eric W. Thomas
(74) Attorney, Agent, or Firm—Arent Fox Kintner Plotkin Kahn

(57) ABSTRACT

An anode lead (11) is embedded at one end thereof in a sintered body in a capacitor element (1), and is welded at the other end thereof to a first outside lead (2). A cathode (12) is electrically connected to a second outside lead (3). The capacitor element is covered with a resin, thereby forming a resin package (5). The tip end of the first outside lead, to which the other end of the anode lead 11 is welded, is configured in such a manner as to have a capacity greater than those of other portions of the first outside lead: namely, the tip end of the first outside lead is widened or thickened in such a manner as to increase the volume of the first outside lead per unit length. Thus, it is possible to provide a solid electrolytic capacitor having the structure in which inclination of the welded portion of the anode lead can be eliminated or the welding reliability of the anode lead can be enhanced without reducing the size of the sintered body in the capacitor element or increasing the size of the package.

3 Claims, 2 Drawing Sheets

SOLID ELECTROLYTIC CAPACITOR

FIELD OF THE INVENTION

The present invention relates to a solid electrolytic capacitor including a sintered body composed of powder of valve acting metal such as tantalum. More particularly, the present invention relates to a solid electrolytic capacitor having the structure in which it is possible to enhance the reliability of welding between an anode lead embedded in a sintered body and a tip end of an outside lead.

BACKGROUND OF THE INVENTION

As shown in FIG. 3, a solid electrolytic capacitor in the prior art is configured such that an anode lead 11 of a capacitor element 1 is electrically connected to one outside lead 3, and further, a cathode 12 formed at the outer periphery of the capacitor element 1 is electrically connected to another outside lead 3 via a fuse 4, wherein the entirety is molded with a resin to be covered with a resin package 5. Reference numeral 13 designates a water-repellent insulation ring. The anode lead 11 of the capacitor element 1 is formed by embedding a wire made of tantalum in a sintered body composed of powder of valve acting metal such as tantalum, aluminum or niobium. The tip end of the anode lead 11 of the capacitor element 1 is resistance-welded to the tip end of the first outside lead 2, as described above, to be electrically connected to the first outside lead 2 formed of a lead frame. After the formation of the resin package 5 by molding, the outside leads 2 and 3 are cut and separated from the lead frame, followed by forming, to be thus formed into the above-described structure.

In the solid electrolytic capacitor in the prior art, the sintered body in the capacitor element is as remarkably small as about 1 mm cubic, the anode lead embedded in the sintered body is formed of a wire having a diameter as fine as about 0.2 mm, and a length of the anode lead projecting from the sintered body is as short as about 1 mm as requested for miniaturization of a part. Consequently, the contact area between the anode lead and the outside lead becomes remarkably small. Moreover, the anode lead is made of a material having a high melting point such as tantalum, as described above, so that the anode lead is hardly melted by welding: namely, it is poor in weldability. Additionally, even if a current in welding is increased or a welding time is prolonged for the purpose of sufficient welding, only the outside lead is melted and sunk in since the outside lead, in contrast, is made of a soft material such as Alloy 42, Ni or Cu, thereby making complete welding impossible. Therefore, the anode lead may be inclined in welding to the outside lead, as shown in FIG. 3, and therefore, the welding reliability may be degraded to induce a break of the wire caused by separation of a welded portion during use.

In the meantime, in the case where the area of the welded portion between the leads is enlarged by extending the anode lead, and further, the outside lead, the package per se is increased in size. This is contradictory to the reduction in the size and weight of electronic parts. Moreover, if the profile of the package is suppressed, the volume of the sintered body in the capacitor element is decreased, thereby making it impossible to achieve the desired characteristics of the capacitor.

SUMMARY OF THE INVENTION

An object of the present invention is to provide a solid electrolytic capacitor having the structure in which it is possible to enhance the welding reliability of an anode lead and to prevent any inclination of a welded portion of the anode lead without reducing the volume of a sintered body in a capacitor element or enlarging a package.

A solid electrolytic capacitor according to the present invention comprises: a capacitor element having an anode formed by embedding one end of an anode lead in a sintered body composed of valve acting metal from one side face of the sintered body and a cathode formed on a side wall of the sintered body; a first outside lead, to which the other end of the anode lead is welded; a second outside lead, to which the cathode is electrically connected; and a resin package covering the capacitor element; wherein the tip end of the first outside lead, to which the other end of the anode lead is welded, is configured in such a manner as to have a capacity greater than those of other portions of the first outside lead.

Here, "the tip end of the first outside lead is configured in such a manner as to have a capacity greater than those of the other portions" means that the volume of the lead per unit length in a direction in which the outside lead extends becomes larger at the tip end of the first outside lead than those of the other portions, for example the tip end of the first outside lead is widely formed more than the other portions, or the widely formed portion is folded over to form a thick portion, or only the tip end is thickly formed.

With this configuration, since there is originally a space corresponding to the width of the capacitor element in a direction perpendicular to the direction in which the outside lead extends, the tip end of the first outside lead can be enlarged without exerting any adverse influence on the size of the package or capacitor element, and further, the anode lead can be increased in length by bending in a lateral direction, thereby enlarging the welded area. Moreover, since a thermal capacity can be increased by folding the wide portion so as to thicken the tip end or thickly forming the tip end from the beginning, the fine anode lead can be increased in temperature to be securely welded to the first outside lead before the first outside lead may be sunk in even if the welding condition is reinforced by increasing a current in welding. Therefore, it is possible to prevent any bending or inclination and enhance the reliability of welding strength.

Specifically, a portion of the first outside lead, to which the anode lead is welded, is widely formed so that the capacity can be increased, and the other end of the anode lead bent in a lateral direction is welded to the first outside lead at the wide portion; a portion of the first outside lead, to which the anode lead is welded, is widely formed toward both ends from the center or is widely formed toward mainly either end from the center, and further, the wide portion is folded over toward the center, and then, the other end of the anode lead is welded to the folded portion; or a portion of the first outside lead, to which the anode lead is welded, is thickly formed, and the other end of the anode lead is welded to the thick portion.

DETAILED DESCRIPTION

Figure 1:
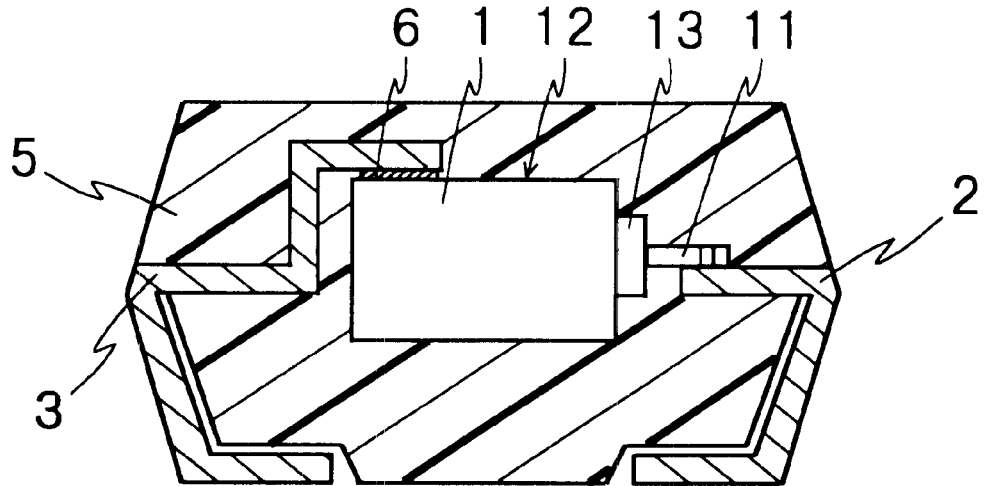
FIGS. 1(a) and 1(b) are a cross-sectional view showing a solid electrolytic capacitor in a preferred embodiment according to the present invention and an exaggeratedly enlarged view showing a welded portion of an anode lead, respectively.
Figure 1:
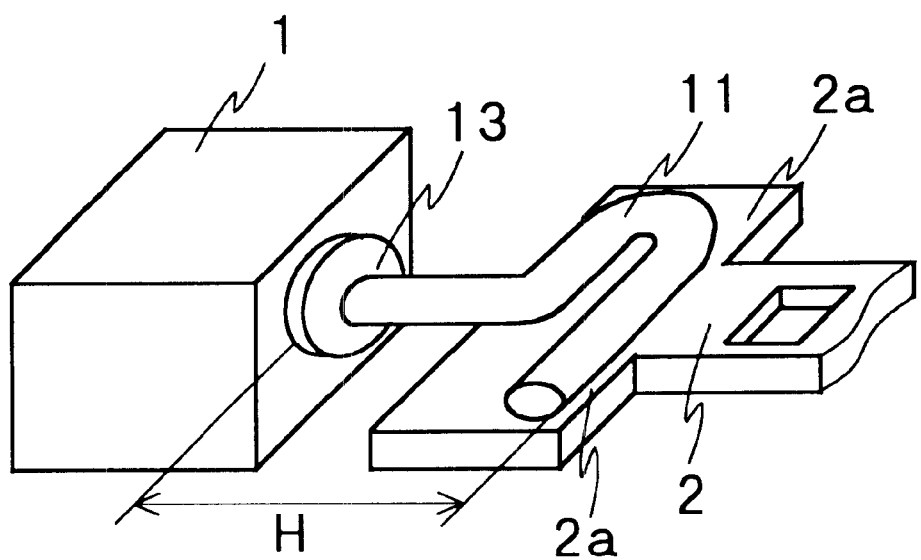

A solid electrolytic capacitor according to the present invention is configured such that a capacitor element 1 includes an anode formed by embedding one end of an anode lead 11 in a sintered body composed of valve acting metal from one side face of the sintered body, and a cathode 12 formed on a side wall of the sintered body, as shown in FIGS. 1(a) and 1(b) which are a cross-sectional view showing the solid electrolytic capacitor in a preferred embodiment according to the present invention and an exaggeratedly enlarged view showing a welded portion of the anode lead, respectively. The other end of the anode lead 11 is welded to a first outside lead 2, and further, the cathode 12 is electrically connected to a second outside lead 3. The capacitor element 1 is covered with a resin, thereby forming a resin package 5. The present invention is featured in that the tip end of the first outside lead 2, to which the other end of the anode lead 11 is welded, has a capacity greater than those of other portions of the first outside lead 2, that is, the tip end of the first outside lead 2 is increased in width or thickness, so that the volume of the outside lead per unit length in an axial direction becomes greater.

In the embodiment shown in FIG. 1(a), a wide portion 2a is formed at the tip end of the first outside lead 2, as the welded portion thereof is enlarged in FIG. 1(b), and the anode lead 11 of the capacitor element 1 is cut longer, to be bent and folded in a lateral direction (i.e., in a direction perpendicular to a direction in which the anode lead extends), as shown in FIG. 1(b). Consequently, the welded portion between the anode lead 11 and the first outside lead 2 is enlarged to the width of the wide portion of the first outside lead 2, so that the welded portion becomes large in area, and thus, is formed over the large area, as shown in FIG. 1(b). Namely, the wide portion 2a of the first outside lead 2 is formed in substantially the same width as that of the capacitor element 1, and such a width is originally required for the capacitor element 1, and therefore, the area of the welded portion can be enlarged without any increase in size of the resin package 5. Although the welded area becomes large by the effect of the wide portion 2a, the entirety can be welded in a single step since the capacitor element 1 is as small as about 1 mm cubic and is as narrow as about 1 mm in a wide region.

The anode lead 11 can be bent into a constant shape by an automatic machine or the like after the formation of the capacitor element 1. Moreover, the wide portion 2a of the first outside lead 2 can be formed into a desired shape only by forming a punch die into the desired shape in punch-molding a lead frame.

The capacitor element 1 is formed in accordance with the following procedure. First of all, powder of, for example, tantalum out of valve acting metals such as tantalum, aluminum and niobium is molded in about 1 mm cubic, and simultaneously, the anode lead 11 is embedded in the molded powder, followed by sintering in a vacuum, thereby forming a sintered body in which the anode lead 11 is embedded on one side wall. The anode lead 11 is formed of a tantalum wire having a diameter of, e.g., 0.2 mm. On the early fabricating stages, the anode lead 11 is formed in such a manner that the length of a portion projecting from the sintered body becomes about 5 to 8 mm.

Next, a water-repellent insulation ring 13 is fitted to the root of the anode lead 11. Thereafter, the tip end of the anode lead 11 in the capacitor element is welded to, e.g., a stainless bar made of a stainless plate in a unit of several tens of anode leads. The sintered bodies are welded to the stainless bar via the anode leads 11 are soaked together in, for example, a phosphoric acid solution. In this way, anodic oxidation is performed by using the anode lead 11 serving as an anode, so that an oxide film made of $Ta_2O_5$ is formed around the tantalum powder (conversion treatment). Subsequently, the sintered bodies are soaked in a manganese nitrate solution, thereby forming a manganese dioxide layer (not shown) inside of and at the outer peripheral surface of the sintered body. Since the oxide film may be damaged in forming the manganese dioxide layer, re-conversion treatment is performed by repeating several times the processes for forming the oxide film and the manganese dioxide layer. Furthermore, a graphite layer (not shown) is formed at the outer surface of the manganese dioxide layer, and then, a silver layer (not shown) is formed around the graphite layer, thus forming the capacitor element 1 having a cathode 12 thereon.

The anode lead 11 of the capacitor element 1 is cut off in a length of about 2 to 3 mm being greater than an anode lead in the prior art when the anode leads 11 are cut off one by one from the above-described stainless bar, and then, is bent in the lateral direction, as described above. The height from the side wall of the sintered body after bending to the endmost portion of the anode lead 11 (indicated by H in FIG. 1(b) is set to about 0.5 mm which is substantially the same as the length of the projecting portion of the anode lead 11 in the capacitor element in the prior art.

Figure 3:
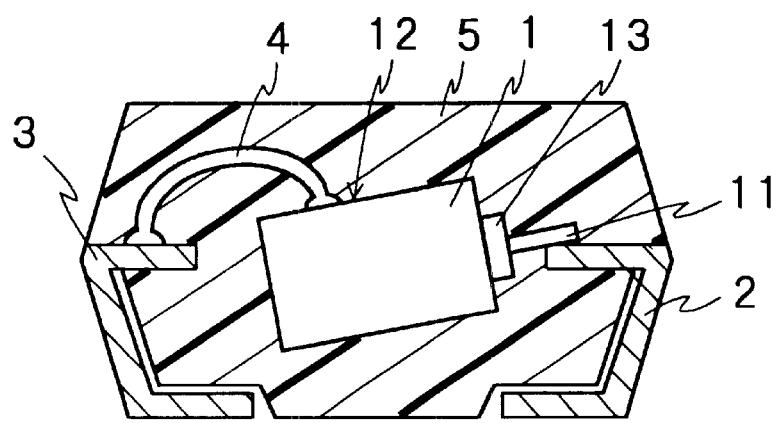
FIG. 3 is a cross-sectional view showing a solid electrolytic capacitor in the prior art.

In this manner, the capacitor element 1 having the bent portion at the tip end of the anode lead 11 is resistance-welded to the lead frame, in which the wide portion 2a is formed at the tip end of the first outside lead 2, as described above, over the wide range of the bent portion of the anode lead 11. On the other hand, the cathode 12 is bonded to the second outside lead 3 formed by bending via Ag paste 6 such as a metal material having a low melting point, for example, a solder material, not shown. Although not illustrated, a through hole is formed at the second outside lead 3 at the bonded portion, and is filled with an arc-extinguishing medium. In the case where a large current flows due to abnormality of the capacitor element, the metal material having a low melting point is melted by the resultant increase in temperature, to be sucked up by the arc-extinguishing medium, whereby the capacitor element 1 and the outside lead 3 are separated from each other. The solder material may be not inserted, or a wire type material may be used, as shown in FIG. 3.

The capacitor element 1 is set inside a mold die having a cavity encompassing the capacitor element 1, and then, a molding resin is filled into the cavity of the die, followed by hardening, thereby forming the resin package 5. Thereafter, the first and second outside leads 2 and 3 are separated from the lead frame, to be subjected to forming, thus obtaining the solid electrolytic capacitor having the structure shown in FIG. 1(a).

According to the present invention, since the outside lead at the portion, to which the anode lead is welded, is widely formed, the anode lead is bent in the lateral direction, thereby increasing the area of the welded portion. Consequently, the anode lead can be welded to the outside lead over a relatively large area even in a small solid electrolytic capacitor, thus stabilizing welding strength. In the meantime, since the area of the outside lead is enlarged in the direction perpendicular to the direction in which the lead extends, i.e., in the lateral direction, a space can be sufficiently secured without increasing the size of the resin package or reducing the area of the sintered body even if the wide portion of the outside lead is enlarged to the extent of about the width of the sintered body in the capacitor element. As a result, it is possible to enhance the welding reliability of the anode lead without increasing the size of the resin package or reducing the size of the capacitor element so as to degrade the characteristics of the capacitor element.

Figure 2:
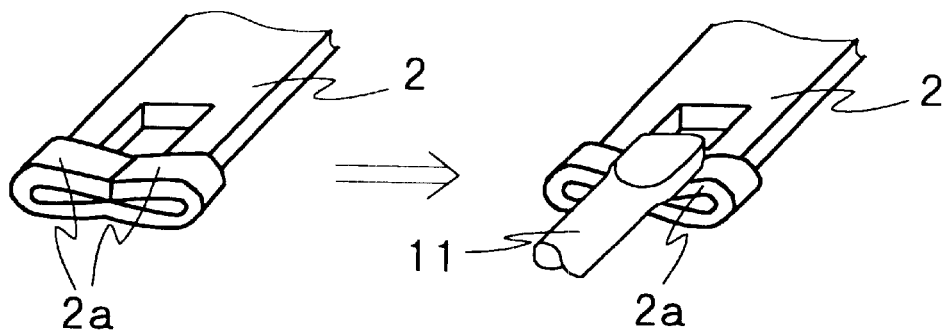
FIGS. 2(a) and 2(b) are views showing a welded portion of an anode lead in a solid electrolytic capacitor in other preferred embodiments according to the present invention.
Figure 2:
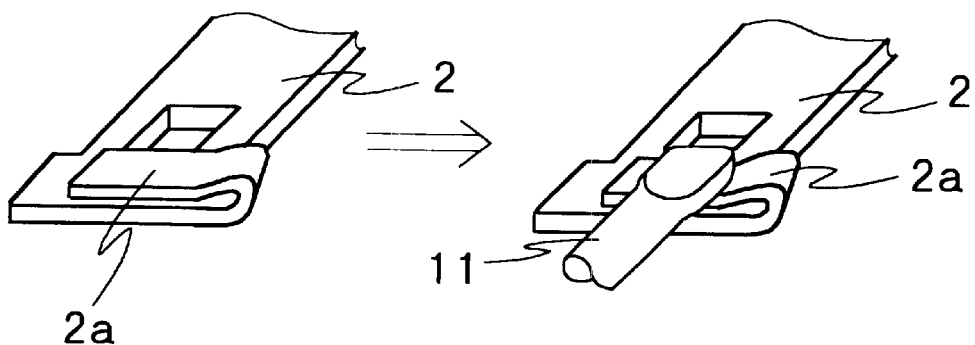

In the above-described embodiment, the formation of the wide portion at the tip end of the outside lead can increase the area of the portion to be welded to the anode lead, thus enhancing the welding reliability. However, the degradation of the welding reliability may also be caused by sinking easiness of the outside lead made of a soft metal material in spite of melting retardancy of the anode lead made of the metal having a high melting point, as described above. FIGS. 2(a) and 2(b) illustrate other preferred embodiments which have been accomplished in an attempt to improve the above-described point. Namely, in the embodiments shown in FIGS. 2(a) and 2(b), a wide portion is formed at the tip end of a first outside lead 2, like the foregoing embodiment, and then, is folded toward the center so as to increase the thickness at the center.

In the embodiment shown in FIG. 2(a), wide portions 2a are formed at both tip ends of an outside lead 2, and then, are folded toward the center. In the embodiment shown in FIG. 2(b), a wide portion 2a is formed only at either tip end of an outside lead 2, and then, is folded over inward. Either of the structures can produce the same effect as that of the foregoing embodiment.

Like the above-described embodiments, the wide portion 2a formed at the tip end of the first outside lead 2 is folded over inward, so that the thickness of a welded portion at the tip end of the outside lead becomes twice, i.e., about 0.2 mm, leading to an increase in thermal capacity. Consequently, since durability against a current in resistance welding can be enhanced, the outside lead can be prevented from being sunk in welding, thus to be securely welded to the anode lead 11. As a result, the resistance welding can be performed while allowing a current to flow sufficiently, thus enhancing the reliability of the resistance welding in the same manner as the foregoing embodiment.

In view of this, the outside lead at the welded portion may be thickly formed from the beginning so as to increase the capacity thereat even unless the tip end of the outside lead is folded over inward so as to increase the capacity thereat. If the outside lead at the welded portion is thickly formed, the thermal capacity becomes great. Consequently, it is possible to achieve sufficient durability against the current in the resistance welding, thereby preventing any degradation of the welding reliability due to the outside lead damaged by the current in the welding.

According to the present invention, it is possible to enhance the welding strength between the anode lead and the outside lead without any adverse influence on the electric characteristics or profile dimension of the capacitor, and further, to remarkably enhance the welding reliability. Thus, the reliability can be significantly enhanced even in a solid electrolytic capacitor of a very small size.

Although preferred example have been described in some detail it is to be understood that certain changes can be made by those skilled in the art without departing from the spirit and scope of the invention as defined by the appended claims.

What is claimed is:

1. A solid electrolytic capacitor, comprising:

a capacitor element having an anode formed by embedding one end of an anode lead in a sintered body composed of valve acting metal from one side face of said sintered body and a cathode formed on a side wall of said sintered body;

a first outside lead, to which the other end of said anode lead is welded;

a second outside lead, to which said cathode is electrically connected; and a resin package covering said capacitor element;

a tip end of said first outside lead, to which said other end of said anode lead is welded, being configured in such a manner as to have a capacity greater than those of other portions of said first outside lead, wherein a portion of said first outside lead, to which said anode lead is welded, is widely formed so that the capacity can be increased, and the other end of said anode lead bent in a lateral direction is welded to said first outside lead at the wide portion.

2. A solid electrolytic capacitor, comprising:

a capacitor element having an anode formed by embedding one end of an anode lead in a sintered body composed of valve acting metal from one side face of said sintered body and a cathode formed on a side wall of said sintered body;

a first outside lead, to which the other end of said anode lead is welded;

a second outside lead, to which said cathode is electrically connected; and a resin package covering said capacitor element;

a tip end of said first outside lead, to which said other end of said anode lead is welded, being configured in such a manner as to have a capacity greater than those of other portions of said first outside lead, wherein a portion of said first outside lead, to which said anode lead is welded, is widely formed toward both ends from the center, and further, the wide portions are folded over toward the center, and then, the other end of said anode lead is welded to the folded portion.

3. A solid electrolytic capacitor, comprising:

a capacitor element having an anode formed by embedding one end of an anode lead in a sintered body composed of valve acting metal from one side face of said sintered body and a cathode formed on a side wall of said sintered body;

a first outside lead, to which the other end of said anode lead is welded;

a second outside lead, to which said cathode is electrically connected; and a resin package covering said capacitor element;

a tip end of said first outside lead, to which said other end of said anode lead is welded, being configured in such a manner as to have a capacity greater than those of other portions of said first outside lead, wherein a portion of said first outside lead, to which said anode is welded, is widely formed toward either end from the center, and further, the wide portion is folded over toward the center, and then, the other end of said anode lead is welded to the folded portion.

* * * * *